United States Patent [19]

Kawabe

[11] Patent Number: 4,614,078
[45] Date of Patent: Sep. 30, 1986

[54] APPARATUS FOR TRANSVERSELY SEALING PACKAGES

[75] Inventor: Seikichi Kawabe, Kanazawa, Japan

[73] Assignee: Shibuya Kogyo Co., Ltd., Kanazawa, Japan

[21] Appl. No.: 759,032

[22] Filed: Jul. 25, 1985

[30] Foreign Application Priority Data

| Jul. 31, 1984 | [JP] | Japan | 59-162356 |
| Sep. 14, 1984 | [JP] | Japan | 59-193033 |
| Oct. 4, 1984 | [JP] | Japan | 59-208638 |
| Jan. 16, 1985 | [JP] | Japan | 60-6344 |
| Jan. 17, 1985 | [JP] | Japan | 60-5207[U] |

[51] Int. Cl.⁴ .............................................. B65B 9/08
[52] U.S. Cl. ............................ 53/551; 53/548; 53/561; 493/208
[58] Field of Search ........... 53/550, 551, 552, 553, 53/554, 555, 450, 373, 561, 548; 493/208

[56] References Cited

U.S. PATENT DOCUMENTS

| 3,777,451 | 12/1973 | Larson et al. .............. 53/373 X |
| 3,943,683 | 3/1976 | Kovacs et al. |
| 4,034,536 | 7/1977 | Mahaffy et al. ........... 53/450 X |

FOREIGN PATENT DOCUMENTS

| 1047294 | 11/1966 | United Kingdom . |
| 1214709 | 12/1970 | United Kingdom . |
| 1447695 | 8/1976 | United Kingdom . |
| 1576540 | 10/1980 | United Kingdom . |
| 2058657 | 4/1981 | United Kingdom . |

Primary Examiner—James F. Coan
Attorney, Agent, or Firm—Flynn, Thiel, Boutell & Tanis

[57] ABSTRACT

The invention relates to an apparatus for transversely sealing packages in which transverse seals are applied to a continuous length of tubular member, in a direction transverse to the length thereof when the tubular member contains a filling such as beverage, whereby an enclosed package is formed between adjacent transverse seals. A plurality of carrier means which operate to hold the tubular member and apply transverse seals is disposed around a rotatable body which is adapted to be continuously driven for rotation. Each of the carrier means includes an inner mold and an outer mold which are disposed inward and outward as viewed in the radial direction of the rotatable body, and the outer mold can be closed against the inner mold or moved to its open position. The tubular member is continuously supplied to the inner mold in the open position of the outer mold, and a transverse seal is applied thereto while it is held between the inner mold and the outer mold. The tubular member is then removed out of the inner mold when the outer mold assumes its open position. In this manner, a high speed operation is enabled while assuring a sufficient length of time during which the tubular member is held in the carrier means to apply a transverse seal in accordance with a printed pattern on the member in a reliable manner.

12 Claims, 13 Drawing Figures

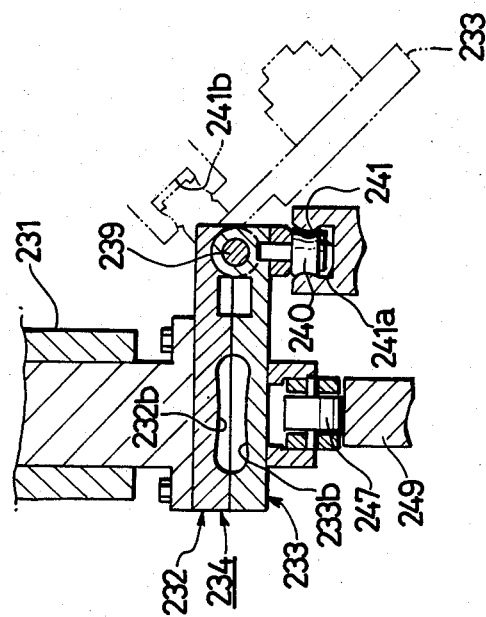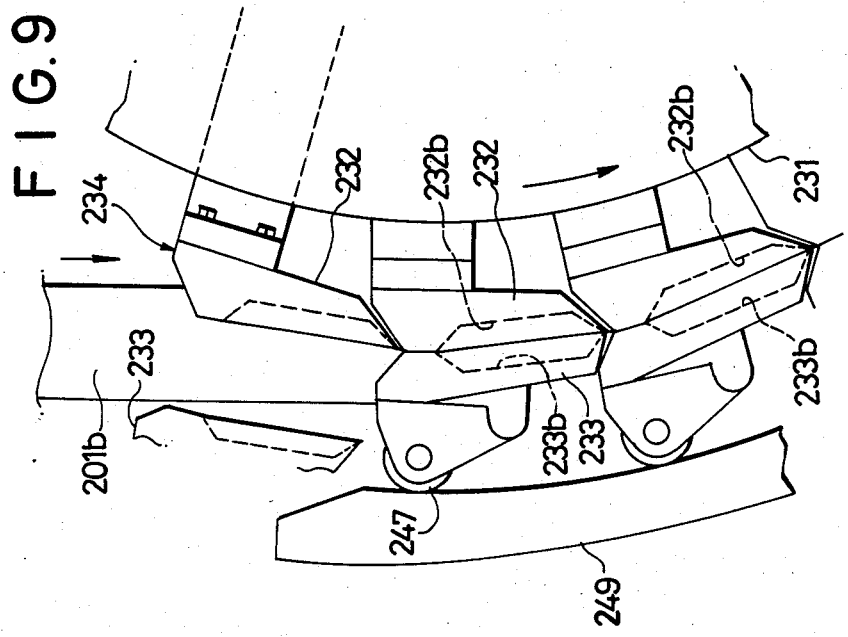

APPARATUS FOR TRANSVERSELY SEALING PACKAGES

FIELD OF THE INVENTION

The invention relates to an apparatus for transversely sealing packages, or more particularly, to an apparatus which seals a continuous length of tubular member at intervals in a direction transverse to the length thereof and in registration with printed patterns thereon while the member is filled with beverage or the like so that successively adjacent transverse seals define enclosed packages or containers.

DESCRIPTION OF THE PRIOR ART

Apparatus which has been used in the prior art to produce such enclosed packages can be categorized into two types. In an apparatus of first type, a length of sheet-like material to which a thermoplastic film is applied is folded upon itself, and its overlapping ends are longitudinally sealed together by a heat sealing operation to define a tubular member. By a heat sealing operation, the tubular member is sealed at a given interval in a direction transverse to the length thereof, and the member is cut on one side of each seal, thus forming a bag-shaped container which is open at its one end. The bag-shaped container is supported in an upright position with the opening located on the top, and a filling such as beverage is injected into the container, whereupon the opening is sealed to define an enclosed container.

In an apparatus of second type, the tubular member is formed from a length of sheet-like material as mentioned, and its one end is held sandwiched in a transverse sealing device, which closes the end by applying a transverse seal therein by a heat sealing operation. Under this condition, a filling is injected into the tubular member which has an increased length. Subsequently, the tubular member is released from the transverse sealing device, and is intermittently conveyed through a given distance, whereupon it is again held sandwiched in the transverse sealing device which then applies a transverse seal, thus allowing a filling to be introduced into the space defined between adjacent transverse seals to form an enclosed container or package. Such process is repeated to convey the tubular member intermittently after the injection of a filling and the application of a transverse seal thereto at a given interval by means of the transverse sealing device. Subsequently, the tubular member is cut through the central portion of the transverse seals to divide it into individual enclosed containers.

However, with the apparatus of first type, a filling such as juice is injected after a bag-shaped container is formed which is open at its one end, so that an increased number of steps and an increased length of time are required to complete enclosed containers. In addition, since the filling is injected into the individual bag-shaped containers, there are many chances for both the containers and the filling to be exposed to the atmosphere and hence to the invasion of miscellaneous bacteria, presenting sanitary problems.

On the other hand, with the apparatus of second type, the described sanitary problems can be overcome since the injection of the filling occurs as the tubular member is formed. However, since the tubular member is intermittently conveyed, with the transverse seals being applied during the time the tubular member remains at rest, it is difficult to achieve a high speed operation. Another factor relates to an increased length of dwell time to result in an inefficient operation since an increased length of time is required to provide a transverse seal in a reliable manner.

SUMMARY OF THE INVENTION

Therefore, it is an object of the invention to provide an apparatus for transversely sealing packages efficiently which permits a tubular member containing a filling therein to be conveyed continuously while applying transverse seals thereto at a given interval.

An apparatus for transversely sealing packages according to the invention comprises a rotatable body adapted to be set in continuous rotating motion, a plurality of carrier means disposed along the periphery of the rotatable body and each including an inner mold located inward and an outer mold located outward as viewed radially of the rotatable body, and drive means for urging the outer mold against the inner mold and for moving the outer mold to its open position which is laterally offset in the direction of rotation from the position where it is located opposite to the inner mold. In the open position of the outer mold, a tubular member containing a filling therein is supplied to the inner mold, and a transverse seal is applied to the tubular member in a direction transverse to the direction in which it is conveyed when the outer mold is urged against the inner mold to hold the tubular member sandwiched therebetween. An enclosed package which is defined by adjacent transverse seals is removed out of the inner mold when the outer mold is at its open position.

With the described arrangement, the carrier means which function to hold the tubular member therein and to seal it transversely can be rotated in an integral manner with the rotatable body so as to convey the tubular member in a continuous manner. The carrier means is capable of holding the tubular member sandwiched therein in a continuous manner through a given angle of rotation, whereby a time period is secured which is required to provide a transverse seal in a reliable manner. In this manner, a high speed operation is enabled, and enclosed packages can be manufactured efficiently.

It is another object of the invention to assure that a transverse seal can be applied to the tubular member exactly at a given location which is in registration with a printed pattern thereon or the like despite the occurrence of an elongation or shrinkage in the tubular member.

At this end, the carrier means is disposed to be displaceable in a reciprocatory manner either in the direction of rotation or in the radial direction of the rotatable body so that the displacement of the respective carrier means in either rotational or radial direction permits a spacing between adjacent carrier means to be adjusted.

Above and other objects, features and advantages of the invention will become apparent from the following description of several embodiments thereof with reference to the drawings.

BRIEF DESCRIPTION OF THE DRAWINGS

FIG. 9 is a fragmentary front view of carrier means which may be used in a further embodiment of the invention;

FIG. 10 is a cross section of the arrangement shown in FIG. 9.

DETAILED DESCRIPTION OF EMBODIMENTS

Figure 1:
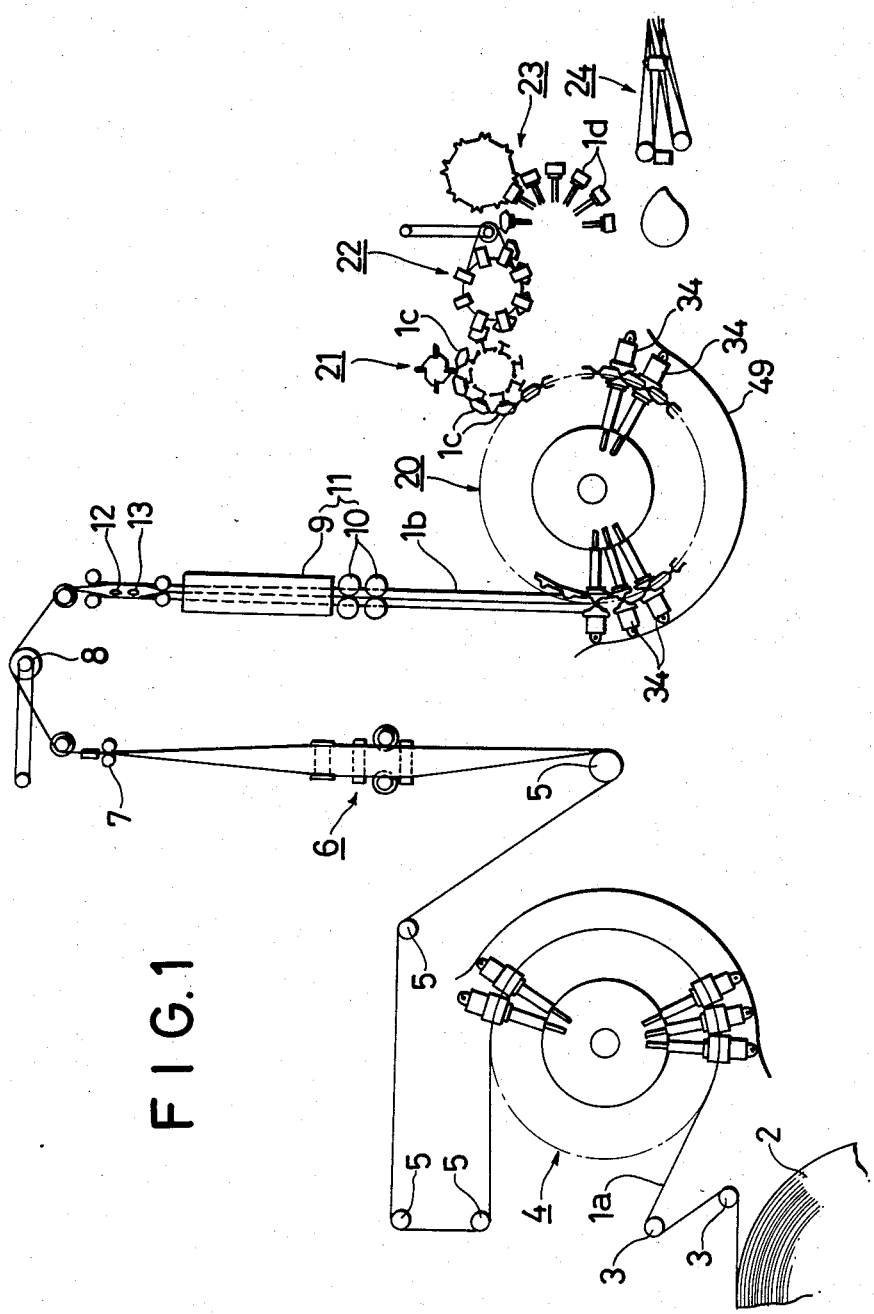
FIG. 1 is a schematic illustration of the entire apparatus which is used to manufacture a beverage filled package, including the apparatus according to the invention.
Figure 2A:
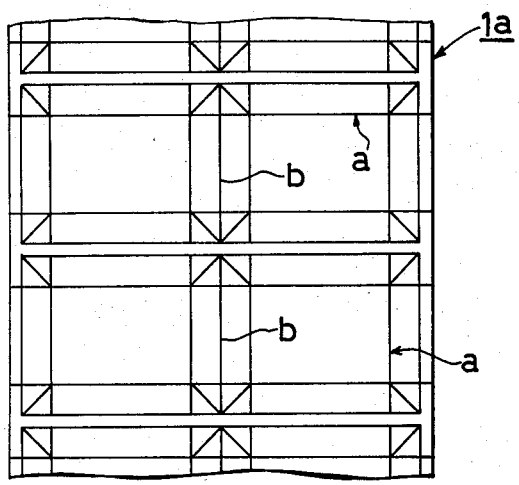
FIG. 2a is a plan view of a sheet-like material in which fold lines are impressed according to a desired configuration.

Referring to FIG. 1, there is shown a general arrangment of an apparatus which is used to manufacture a beverage filled package. The general process of manufacturing packages which are filled with the beverage will be initially described with reference to FIG. 1. A web or continuous length of sheet-like material 1a to which a thermoplastic film is applied and which has desired patterns printed thereon is continuously supplied from a reel 2 which stores a roll thereon. The web supplied is passed around a plurality of guide rolls 3 to a fold line impressing unit 4 where fold lines a, required to form a package of a desired configuration, are continuously impressed in the web 1a in accordance with the printed patterns, as shown in FIG. 2a.

After required fold lines are impressed in the web 1a by the impression unit 4, the web is then passed around a plurality of guide rolls 5 to be conveyed into a folding unit 6. Part of the web 1a which is disposed within the folding unit 6 is folded upon itself along a fold line b (see FIG. 2a) which is impressed along the longitudinal centerline, and the folded web 1a is supplied to a following roll pair 7 while twisting it through 90°. Accordingly, the folded web 1a which is supplied to the roll pair 7 has the fold line b located on one side thereof while the opposite ends or edges of the web which were previously located on the opposite sides of the fold line b and which now overlap each other as a result of the folding operation are located on the other side.

Figure 2B:
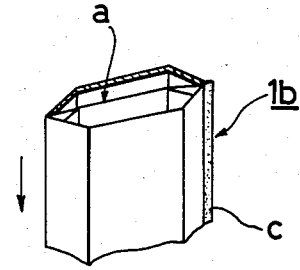
FIG. 2b is a perspective view, partly in section, of a tubular member formed.

After leaving the roll pair 7, the folded web 1a is diverted by being passed around a roll 8, and is fed vertically downward into a heater 9 which heats the web 1a and also through heat sealing press roll pairs 10 which are disposed downstream of the heater 9. Both the heater and the roll pairs 10 are components of a longitudinal sealing unit 11. When the folded web 1a is fed through the longitudinal sealing unit 11 in a downward direction, the overlapping edges of the web 1a are sealed lengthwise or longitudinally by the heat sealing press roll pairs 10, thus forming a tubular member 1b as shown in FIG. 2b.

It will be noted that an injection pipe 12 which is used to inject a filling into the package is located upstream of the heater 9, and extends between the overlapping edges of the web 1a before they are welded together, and through the heater 9 and the heat sealing press roll pairs 10 into the interior of the tubular member 1b formed, thus allowing a liquid filling to be injected into the tubular member 1b. It will also be noted that a suction pipe 13 is juxtaposed with the injection pipe 12 in order to prevent an excess amount filling from being injected, thus recovering such excess filling. It is to be understood that the filling is not limited to a liquid, but may comprise powder or particulate material.

Space transverse seals are successively applied to the tubular member 1b containing a filling therein, in a direction perpendicular to the length thereof, by a transverse sealing unit 20. In this manner, an enclosed package 1c containing a filling is defined between a pair of adjacent transverse seals.

Figure 2C:
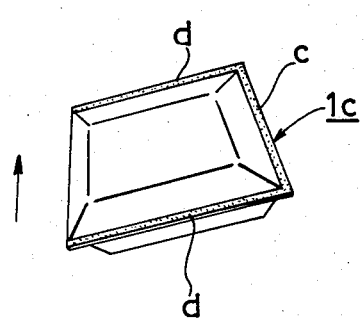
FIG. 2c is a perspective view of a separated box member.

A cutter 21 cuts through an intermediate portion of the transverse seal formed between adjacent packages 1c, thus dividing the tubular member into individual packages 1c. As shown in FIG. 2c, the divided package 1c has the longitudinal seal c formed by the longitudinal sealing unit 11 along its one side and has a pair of transverse seals d, formed by the transverse sealing unit 20 along a pair of sides which are disposed at right angles to the longitudinal seal c.

Figure 2D:
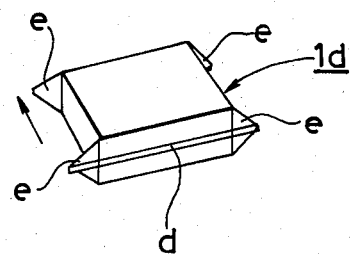
FIG. 2d is a perspective view of a box member immediately before its completion.

An end face shaper 22 and a lateral side shaper 23 press against the opposite end faces and the lateral sides, respectively, of the individual packages 1c, thereby shaping it into a package 1d having the configuration of hexahedron, as shown in FIG. 2d. Ears e which project laterally from opposite sides of the package 1d at its opposite ends are welded to the corresponding lateral sides of the package 1d by a folding and sealing unit 24. This completes the manufacturing of a package.

The folding unit 6, the longitudinal sealing unit 11, the injection unit such as injection pipe 12, the cutter 21, the end face shaper 22, the lateral side shaper 23 and the folding and sealing unit 24 are similar in their essential construction to those known in the art, and therefore will not be described in detail.

The fold line impression unit 4 and the transverse sealing unit 20 are fundamentally constructed in a similar manner. The difference therebetween is that the transverse sealing unit 20 is provided with a sealing surface which is used to apply a transverse seal while the impression unit 4 is provided with an impressing surface which is used to form fold lines a of desired configuration.

Accordingly, the impression unit 4 will not be described specifically, and the construction of only the transverse sealing unit 20 will be described in detail.

Figure 3:
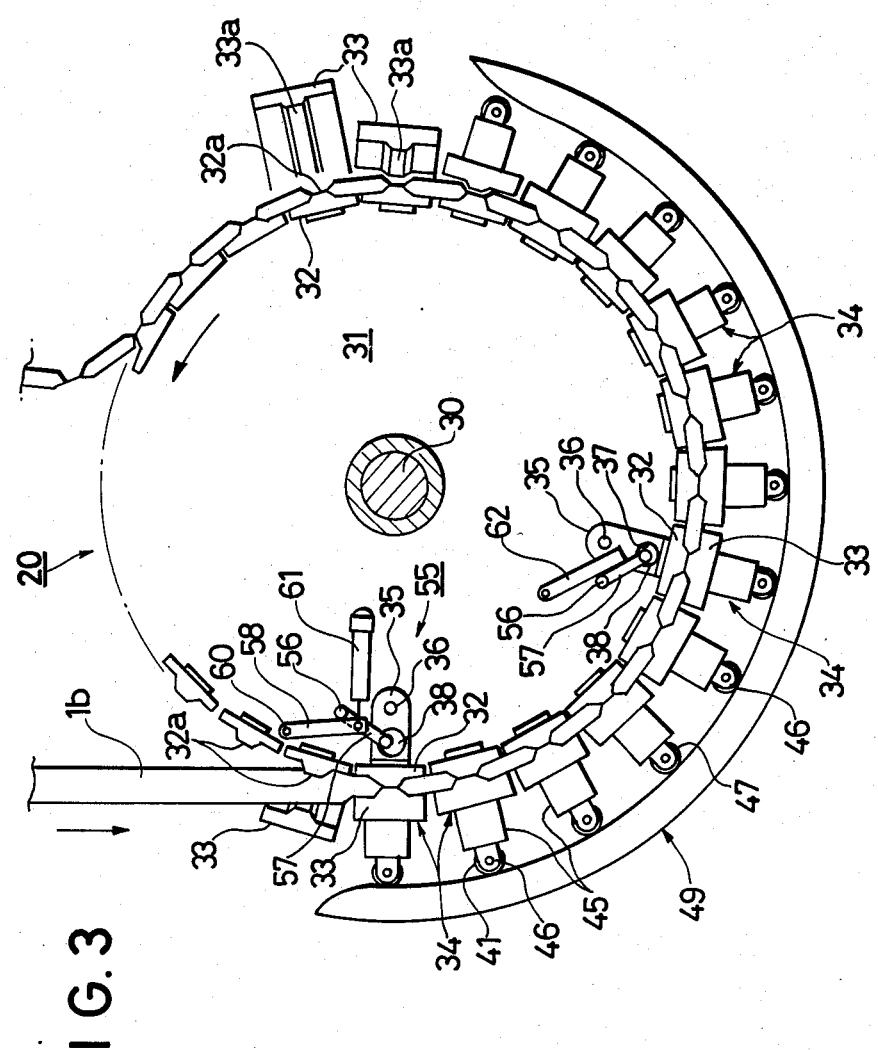
FIG. 3 is a fragmentary front view of an apparatus for transversely sealing packages according to an embodiment of the invention.
Figure 4:
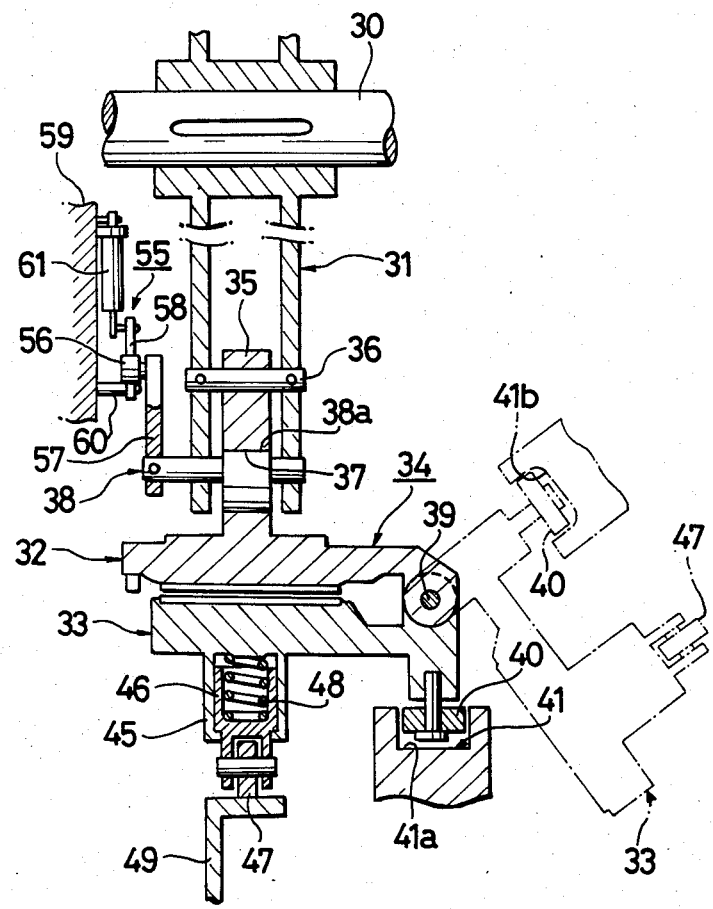
FIG. 4 is a cross section of part of the apparatus shown in FIG. 3.

Referring to FIGS. 3 and 4, the transverse sealing unit 20 includes a drive shaft 30 which is disposed horizontally, and a rotatable body 31 which is mounted on the drive shaft 30. It is to be understood that the drive shaft 30 is continuously driven for rotation by a drive motor, not shown. A plurality of carrier means 34 are disposed at an equal interval along the periphery of the rotatable body 31, and each of the carrier means includes a pair of inner mold 32 and outer mold 33 which are brought into abutment against each other.

As shown in FIG. 4, the inner mold 32 of each of the carrier means 34 is integrally provided with a shank 35 which extends toward the center of the rotatable body 31 and the free end of which is pivotally mounted on the rotatable body 31 by a pin 36. The shank 35 is formed with a circular cam slot 37 therein which extends parallel to the pin 36. A cam member 38 which is pivotally mounted on the rotatable body 31 includes a cam profile 38a which extends parallel to the pin 36 and which is rotatably fitted in the cam slot 37. Accordingly, when the cam member 38 is rotated, the inner mold 32 can be displaced either forwardly or rearwardly as viewed in the direction of rotation of the rotatable body 31.

On the other hand, the outer mold 33 of the carrier means 34 is rotatably coupled to the inner mold 32 by a shaft 39 which is disposed circumferentially of the rotatable body 31. When the outer mold 33 is brought into abutment against the inner mold 32, the tubular member 1b can be held sandwiched therebetween to permit transverse seals to be applied thereto at a desired location. It will be noted that each of the inner mold and the outer mold 32, 33 is formed with a sealing projection 32a or 33a (see FIG. 3), respectively, and is internally assembled with a heater, not shown.

Figure 5:
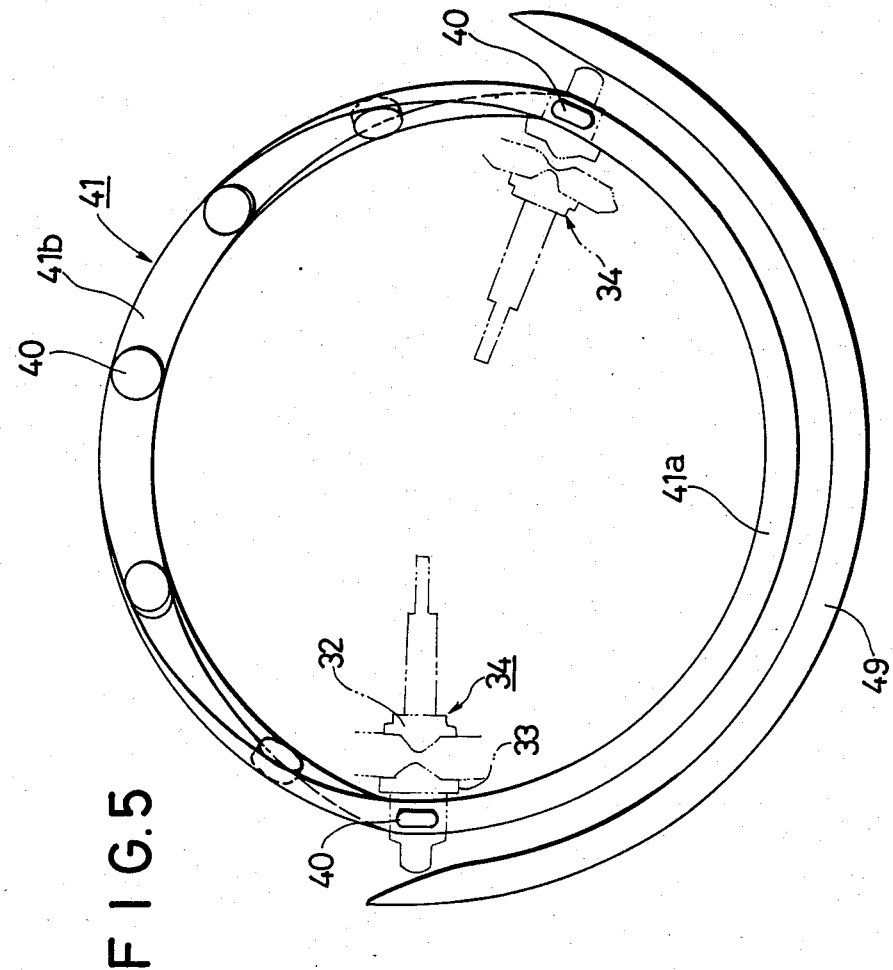
FIG. 5 is a front view of a twisted guide groove in relation to rollers.

When the outer mold 33 is rotated counter-clockwise about the circumferentially directed shaft 39, as viewed in FIG. 4, it can be moved to an open position which is laterally offset, as viewed in the direction of rotation, from the position where it is located radially opposite to the inner mold 32 (see the phantom line illustration of FIG. 4). On one side, each outer mold 33 carries a roller 40 which is engaged with a twisted guide groove 41. The twisted guide groove 41 is generally annular in configuration, extending around the circumference of the rotatable body 31 and is fixed in position. As shown in FIG. 5, the twisted guide groove includes a non-twisted section 41a which extends around substantially one-half the circumference in the lower area and which causes the outer mold 33 to be brought into abutting relationship with the inner mold 32, and a twisted section 41b formed around the remainder which causes the outer mold 33 to be moved away from the inner mold 32 (see the phantom line illustration in FIG. 4).

The respective carrier means 34 are rotated in an integral manner with the rotatable body 31, and the outer mold 33 of each of the carrier means 34 is brought into abutting relationship with the inner mold 32 as the roller 40 thereon moves through the lower, non-twisted section 41a, and is moved away from the inner mold 32 as the roller 40 moves through the upper, twisted section 41b. It will be understood that the provision of the twisted guide groove 41 may be replaced by a cylinder unit or the like which operates to open or close the outer mold 33 on each of the carrier means 34.

Referring to FIG. 4, it will be noted that each outer mold 33 is centrally formed with a cylinder 45 which extends radially outward, with a slider 46 being slidably received in the cylinder 45 and carrying a roller 47 on the free end thereof. A spring 48 is interposed between the bottom of the cylinder 45 and the slider 46 to urge the slider 46 radially outward. The free end of the cylinder 45 is formed with a stop 45a which prevents the slider 46 from being disengaged from the cylinder 45.

A pressing cam member 49 is fixedly disposed in a region commensurate with the extent of the non-twisted section 41a for engaging the roller 47 to urge it radially inward. Accordingly, when the roller 47 engages the cam member 49, the resilience of the spring 48 is effective to urge the outer mold 33 against the inner mold 32, whereby the tubular member 1b can be reliably held between the both molds under a given pressure.

In a region which has moved past the longitudinal sealing unit 11, the tubular member 1b is inserted between the outer and the inner mold 33, 32 when they are separated from each other namely, when the outer mold 33 has been displaced to its open position which is radially offset from the position located radially opposite to the inner mold 32. As the outer mold 33 is driven against the inner mold 32, the tubular member 1b continues to be held between the both molds 32, 33 and is subject to a transverse sealing operation.

The transverse sealing operation takes place reliably while the tubular member 1b is positively held sandwiched between the both molds 32, 33 during the time it passes through a transverse sealing station where the cam member 49 is disposed. Subsequently when the outer mold 33 is moved away from the inner mold 33 and moved to its open position, a section of the tubular member 1b to which the transverse seals are applied is taken out from between the both molds 32, 33 to be fed to the following cutter 21.

It will be appreciated that the location where the transverse seals are applied must be accurately aligned with a printed pattern on the tubular member 1b. It will be seen that the location of such transverse seals will be offset from the printed pattern or patterns if an elongation or shrinkage occurs in the tubular member 1b as a result of temperature changes or errors in the printing or the application of the thermoplastic film. To accommodate for this possibility, a transverse seal positioning mechanism 55 is provided which allows the location of transverse seals to be displaced lengthwise of the tubular member 1b.

In FIGS. 3 and 4, the positioning mechanism 55 shown is designed to establish a minimum spacing between adjacent carrier means 34 while allowing such spacing to be increased in accordance with the printed pattern on the tubular member 1b. Referring to FIG. 4, the cam member 38 associated with each of the carrier means 34 is connected to one end of a lever 57, on the other end of which is mounted a cam follower 56. The cam follower 56 is engageable with a rocking cam member 58, one end of which, located rearward, as viewed in the direction of rotation of the rotatable body 31, is connected through a pin 60 to a frame 59 in a rockable manner. As shown in FIG. 3, the rocking cam member 58 is disposed adjacent to the inlet of the pressing cam member 49 and is disposed to permit the cam follower 56 to abut against the lateral side of the rocking cam member 58 immediately after a pair of inner and outer mold 32, 33 have held the tubular member 1b sandwiched therebetween, thus causing the cam follower to be displaced radially inward to enable the cam member 38 to displace the carrier means 34 forwardly, as viewed in the direction of rotation.

The other end of the rocking cam member 58 is mechanically coupled to suitable drive means 61 disposed on the frame 59, which causes the other end of the cam member 58 to be displaced rockably in the radial direction of the rotatable body 31, thus permitting the displacement in the radially inward direction of the cam follower 56 which engages the cam member 58, and hence the displacement of the carrier means 34 forwardly, as viewed in the direction of rotation, to be adjusted.

At a location downstream of the rocking cam member 58, a return cam member 62 is fixedly mounted on the frame 59 for urging the cam follower 56 radially outward to its given position after it has been displaced radially inward by the action of the rocking cam member 58, thus returning the carrier means 34 to its original position.

Under normal condition when there is no elongation or shrinkage in the tubular member 1b, the positioning mechanism 55 is disposed so that the rocking cam member 58 is located to avoid abutment against the cam follower 56. Accordingly, the individual carrier means 34 is effective to apply transverse seals to the tubular member 1b in their non-operated position.

When an elongation occurs in the tubular member 1b, and hence requires that a spacing between the locations of the transverse seals be increased, the drive means 61 is operated by a signal from a sensor, not shown, which operates to detect the printed pattern on the tubular member 1b, causing the cam member 58 to be rocked radially inward from its non-operative position. Thereupon, the cam follower 56 is displaced radially inward in accordance with the amount of rocking motion which the cam member 58 has experienced, immediately after one pair of inner mold 32 and outer mold 33 in the carrier means 34 have held the tubular member 1b therebetween, and hence the carrier means 34 is displaced forwardly, as viewed in the direction of rotation, while holding the tubular member 1b therein.

As a result of such displacement, the next following carrier means 34 will be spaced from the forwardly disposed carrier means 34 by an increased distance which corresponds to the displacement of the latter, whereby the transverse seal can be applied to the tubular member 1b while holding it at nominal position which corresponds to the increased spacing between the transverse seals. When the second carrier means 34 holds the tubular member 1b, it is also displaced forwardly, as viewed in the direction of rotation, by the action of the rocking cam member 58. Hence, the third carrier means 34 which then follows will also be holding the tubular member 1b at nominal position which corresponds to the increased spacing between the transverse seal positions. The individual carrier means 34 which have been displaced forwardly from their non-operative positions are returned to their original positions by the action of the return cam member 62.

It will be noted that the return cam member 62 may be located to return the carrier means 34 to their original, non-operated positions after the carrier means 34 has ceased to hold the tubular member 1b. Alternatively, the location of the return cam member 62 may be chosen to accommodate for the possibility that a shrinkage occurs in the tubular member 1b, in a situation opposite from that of the described embodiment.

Preferably, the drive means 61 comprises a servo motor which is capable of bringing the cam member 58 to a desired rocked position. However, if it is only necessary that an accommodation for either one of elongation or shrinkage in the tubular member 1b be provided, a cylinder unit or solenoid may be simply used to move the cam member 58 between its non-operated and operated positions.

Figure 6:
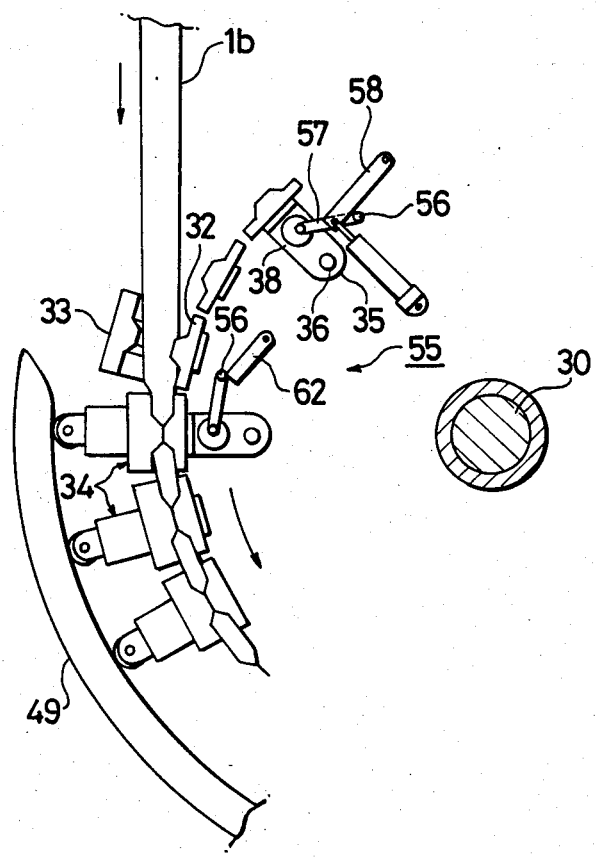
FIG. 6 is a fragmentary front view of a modification of the apparatus shown in FIG. 3.

FIG. 6 shows another embodiment of the invention which represents a modification of the described arrangement in that the location of the positioning mechanism 55 is changed. Specifically, in this embodiment, the return cam member 62 is disposed at the location of the rocking cam member 58 of the first mentioned embodiment, the rocking cam member 58 being disposed slightly upstream of the return cam member 62.

This embodiment represents an accommodation for the occurrence of a shrinkage in the tubular member 1b, in a situation opposite from that of the first mentioned embodiment. When a shrinkage occurs in the tubular member 1b, each of the carrier means 34 is caused by the rocking cam member 58 to be displaced forwardly, as viewed in the direction of rotation, before such carrier means holds the tubular member 1b therein. As a consequence, the tubular member 1b can be engaged by the carrier means 34 at normal positions in the presence of a shrinkage in the tubular member 1b.

When the carrier means 34 has held the tubular member 1b, it is returned to its original, non-operated position by the return cam member 62 before the next following carrier means 34 holds the tubular member 1b, and hence the spacing between the first and the next following carrier means 34 will coincide with the spacing between the locations of transverse seals to be applied to the shrunk tubular member 1b. In this manner, the next following carrier means 34 will hold the tubular member 1b at the normal position.

It will be appreciated that accommodation for the occurrence of an elongation in the tubular member 1b can be made in this embodiment. The described transverse seal positioning mechanism 55 is constructed to accommodate for the occurrence of either one of an elongation or shrinkage in the tubular member 1b, but it is readily possible that accommodation for the both occurrences can be made.

In the event no elongation or shrinkage occurs in the tubular member 1b, the return cam member 62 can be eliminated and all the carrier means 34 may be arranged to be displaced in one direction, as viewed in the direction of rotation, from their non-operated positions while maintaining an equal spacing therebetween. When a displacement of the carrier means takes place, a precise alignment between the tubular member 1b and the individual carrier means 34 can be achieved.

Figure 7:
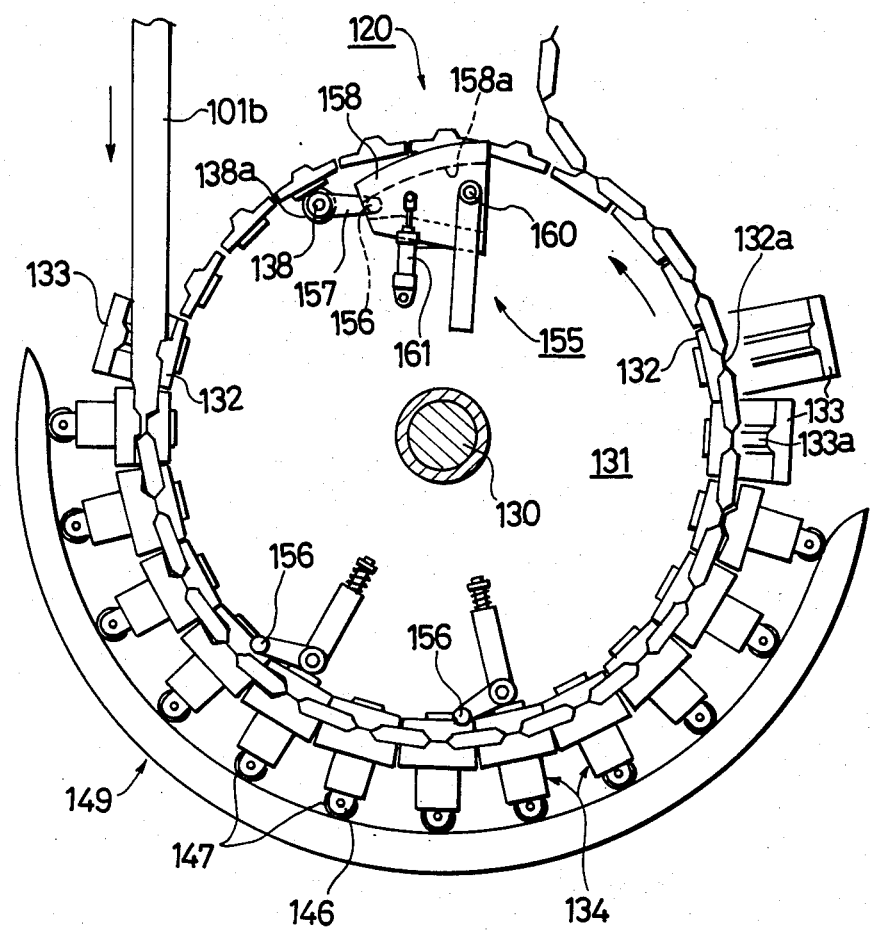
FIG. 7 is a fragmentary front view, similar to FIG. 3, of another embodiment of the invention.
Figure 8:
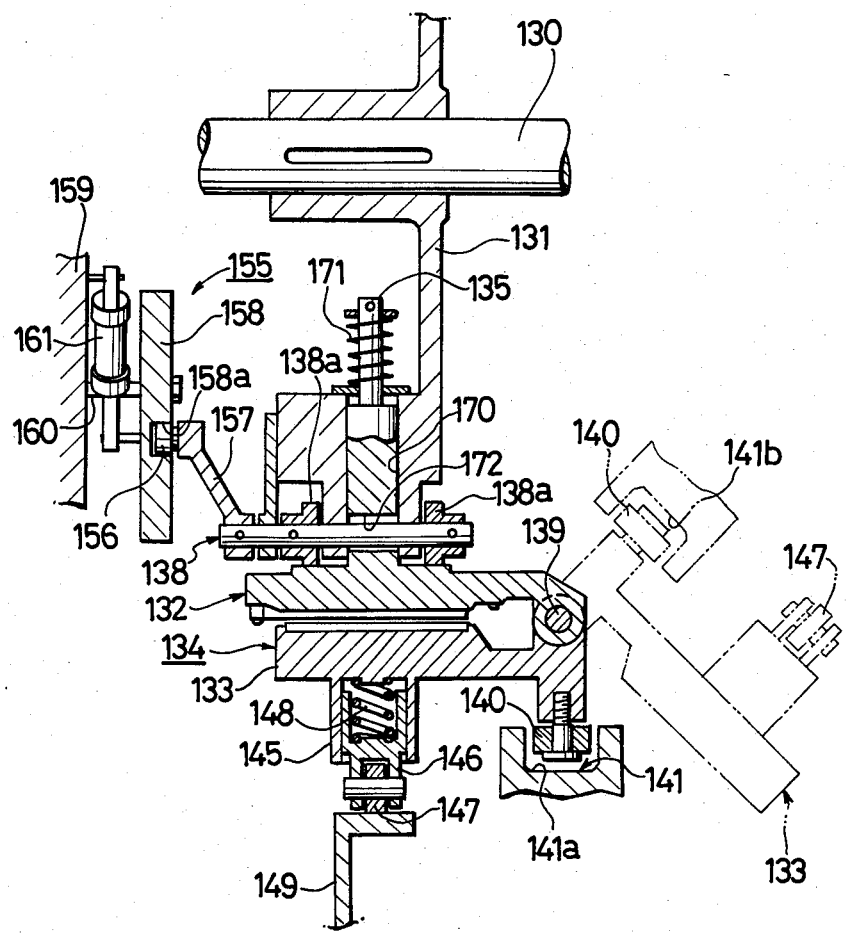
FIG. 8 is a cross section of part of the arrangement shown in FIG. 7.

FIGS. 7 and 8 show another embodiment of the invention which incorporate a different form of transverse seal positioning mechanism 155. In this embodiment, the spacing between the carrier means 134 is adjusted by displacing the carrier means 134 radially rather than forwardly or rearwardly in the direction of rotation, in order to change the location of transverse seals in the direction in which the tubular member 101b is conveyed.

As illustrated in FIG. 8, this embodiment includes a plurality of carrier means 134, each including an inner mold 132 which has an integral shank 135. A rotatable body 131 is formed with a radially extending opening 170, into which the shank 135 is fitted in a slidable manner from the radially outer side. The shank has a free end which projects through the opening, and a spring 171 is disposed between the free end and the rotatable body 131, thus urging the inner mold 132 in a direction toward the center of the rotatable body 131.

Each shank 135 is formed with a radially elongate slot 172, through which a cam shaft 138 extends, the cam shaft being rotatably carried by the rotatable member 131. The cam shaft 138 has a pair of cams 138a, and the inner mold 132 is urged by the spring 171 into abutment against these cams so that the inner mold 132 can be displaced in the radial direction in accordance with the angular position assumed by the cams 138a. An arrangement is made to prevent the cam shaft 138 from being rotating as a result of the pressure exerted by the inner mold 132 as it is urged against the cams 138a.

The cam shaft 138 is connected to one end of a lever 157, the other end of which carries a cam follower 156. The cam follower 156 is engageable with a cam groove 158a which is formed in a rocking cam member 158. As in the previous embodiment, the cam member 158 may be rocked or displaced in the radial direction by means of drive means 161.

As shown in FIG. 7, the cam groove 158a formed in the rocking cam member 158 has a width which is substantially coincident with the diameter of the cam follower 156 at its end which is located forwardly, as viewed in the direction of rotation of the rotatable member 131, but which is far greater than the diameter of the cam follower 156, as viewed in the radial direction, at its end which is located rearward, as viewed in the direction of rotation, thereby assuring that the cam follower 156 will be positively engaged with the cam groove 158a after it has rotated through one revolution together with the rotatable member 131.

As a result of the described arrangement, as the cam member 158 rocks, the cam follower 156 may be displaced radially inward or outward. Accordingly, the carrier means 134 may be displaced radially inward or outward. When the carrier means 134 is displaced radially outward, the spacing between the carrier means 134 may be increased. Conversely, when the carrier means is displaced radially inward, the spacing between the carrier means 134 is decreased. Therefore it is apparent that the transverse seals can be applied at optimum positions independently from any elongation or shrinkage which may occur in the tubular member 101b.

In other respects, the arrangement is similar to that of the previous embodiment, and corresponding parts are designated by reference numerals or characters as used in the description of the first embodiment to which 100 is added.

FIGS. 9 and 10 show a further embodiment of the invention. In the previous embodiments described above, the inner molds 32, 132 and the outer molds 33, 133 are provided with the sealing projections 32a, 33a and 132a, 133a which extend in a direction in which the transverse seals are to be applied., However in the present embodiment, these projections are replaced by recesses 232b, 233b, with each recess being surrounded by sealing surfaces, at least on the front and rear sides of the recess, as viewed in the direction of rotation.

In other respects, the arrangement of the present embodiment is similar to that of the two previous embodiments described above, with corresponding parts being designated by like reference numerals or characters as used in the first mentioned embodiment to which 200 is added.

With this arrangement, the constant volume of the recesses 232b, 233b is advantageous when the tubular member 201b is formed of a pliable material and the filling is a liquid. Specially, a filling of a given quantity can be reliably contained in each package if the carrier means 234 is displaced forwardly or rearwardly, as viewed in the direction of rotation, to change the spacing therebetween.

While the invention has been illustrated and described above in connection with several embodiments thereof, it should be understood that a number of changes, modifications and substitutions therein will readily occur to one skilled in the art from the above disclosure. Hence, it is intended that all these changes, modifications and substitutions be covered by the appended claims.

What is claimed is:

1. An apparatus for transversely sealing packages comprising a rotatable body adapted to be continuously driven for rotation, a plurality of carrier means disposed in spaced relationship around the periphery of the rotatable body and each including an inner mold and an outer mold which are located inward and outward, respectively, as viewed in the radial direction of the rotatable body, drive means for urging the outer mold against the inner mold and for moving the outer mold to its open position which is laterally offset, as viewed in the direction of rotation, from its position where it is located radially opposite to the inner mold, a tubular member containing a filling therein being supplied to the inner mold when the outer mold is in its open position and being held between the inner mold and the outer mold which is then urged against the inner mold, a transverse seal being applied to the tubular member in a direction transverse to the direction in which it is conveyed during the time the tubular member is held between the inner and the outer mold to thereby define an enclosed package between adjacent transverse seals, the enclosed package being removed out of the inner mold in the open position of the outer mold, the carrier means being movable back and forth, as viewed in the direction of rotation of the rotatable body, and a transverse seal positioning mechanism which causes the individual carrier means to be displaced in the direction of rotation to adjust a spacing between adjacent carrier means, in which the transverse seal positioning mechanism comprises a cam member associated with each of the carrier means and operative to cause the associated carrier means to be displaced in the direction of rotation of the rotatable body in accordance with an angular position which it assumes, a cam follower coupled with the cam member to cause an angular movement thereof, a rocking cam member disposed outside the rotatable body and engageable with the cam follower as it is moved by the rotation of the rotatable member to cause a displacement of the cam follower in the radial direction of the rotatable body which in turn causes an angular movement of the cam member, and driving means for rocking cam member in the radial direction of the rotatable body to adjust a radial displacement of the cam follower, thereby adjusting the amount of angular movement of the cam member.

2. An apparatus for transversely sealing packages as defined in claim 1 in which the drive means comprises a roller on the outer mold, and a twisted guide groove which is engaged by the roller, the twisted guide groove being generally annular in configuration and extending along the periphery of the rotatable body, the twisted guide groove including a nontwisted section where the roller is effective to urge the outer mold against the inner mold and a twisted section where the outer mold is moved away from the inner mold.

3. An apparatus for transversely sealing packages as defined in claim 1 in which the drive means comprises a roller slidably mounted on the outer mold so as to be movable radially outward, a spring interposed between the roller and the outer mold, and a pressing cam member for engaging the roller to urge it radially inward when the outer mold is closed against the inner mold.

4. An apparatus for transversely sealing packages as defined in claim 1 in which each of the outer mold and the inner mold is formed with a sealing projection between which the tubular member is held, the projection extending in a direction in which the transverse seal is to be applied.

5. An apparatus for transversely sealing packages as defined in claim 1 in which each of the outer mold and the inner mold is formed with a recess of a given volume, the front and rear sides of the recess, as viewed in the direction of rotation, being formed as transverse sealing surfaces.

6. An apparatus for transversely sealing packages as defined in claim 1, further including a return cam member for returning the cam follower which has been displaced by the rocking cam member to its original position.

7. An apparatus for transversely sealing packages comprising a rotatable body adapted to be continuously driven for rotation, a plurality of carrier means disposed in spaced relationship around the periphery of the rotatable body and each including an inner mold and an outer mold which are located inward and outward, respectively, as viewed in the radial direction of the rotatable body, drive means for urging the outer mold against the inner mold and for moving the outer mold to its open position which is laterally offset, as viewed in the direction of rotation, from its position where it is located radially opposite to the inner mold, a tubular member containing a filling therein being supplied to the inner mold when the outer mold is in its open position and being held between the inner mold and the outer mold which is then urged against the inner mold, a transverse seal being applied to the tubular member in a direction transverse to the direction in which it is conveyed during the time the tubular member is held between the inner and the outer mold to thereby define an enclosed package between adjacent transverse seals, the enclosed package being removed out of the inner mold in the open position of the outer mold, each of the carrier means being movable back and forth in the radial direction of the rotatable body, a transverse seal positioning mechanism for causing a radial displacement of the individual carrier means to adjust a spacing between adjacent carrier means, in which the transverse seal positioning mechanism comprises a cam member associated with each of the carrier means for causing the associated carrier means to be displaced in the radial direction of the rotatable body in accordance with an angular position which it assumes, a cam follower mechanically coupled to the cam member to cause an angular movement thereof, a rocking cam member disposed outside the rotatable body and engageable with the cam follower as it moves during the rotation of the rotatable member to cause a displacement of the cam follower in the radial direction of the rotatable body which in turn causes an angular movement of the cam member, and driving means for rocking the rocking cam member in the radial direction of the rotatable body to adjust a radial displacement of the cam follower, thereby adjusting the amount of angular movement of the cam member.

8. An apparatus for transversely sealing packages as defined in claim 7 in which the drive means comprises a roller slidably mounted on the outer mold so as to be movable radially outward, a spring interposed between the roller and the outer mold, and a pressing cam member for engaging the roller to urge it radially inward when the outer mold is closed against the inner mold.

9. An apparatus for transversely sealing packages as defined in claim 7 in which the rocking cam member includes a cam groove having a width which is substantially equal to the outer diameter of the cam follower at its and which is located forwardly as viewed in the direction of rotation of the rotatable body and which is radially increased at its end which is located rearward as viewed in the direction of rotation of the rotatable body to permit the cam follower which has been radially displaced by the rocking motion of the rocking cam member to engage the cam groove.

10. An apparatus for transversely sealing packages as defined in claim 7 in which each of the outer mold and the inner mold is formed with a sealing projection between which the tubular member is held, the projection extending in a direction in which the transverse seal is to be applied.

11. An apparatus for transversely sealing packages as defined in claim 7 in which each of the outer mold and the inner mold is formed with a recess of a given volume, the front and rear sides of the recess, as viewed in the direction of rotation, being formed as transverse sealing surfaces.

12. An apparatus for transversely sealing packages as defined in claim 7, in which the drive means comprises a roller on the outer mold, and a twisted guide groove which is engaged by the roller, the twisted guide groove being generally annular in configuration and extending along the periphery of the rotatable body, the twisted guide groove including a non-twisted section where the roller is effective to urge the outer mold against the inner mold and a twisted section where the outer mold is moved away from the inner mold.

* * * * *